United States Patent [19]

Fluck

[11] 4,013,179

[45] Mar. 22, 1977

[54] APPARATUS FOR GROUPING COOKIES PRIOR TO PACKAGING

[75] Inventor: René Fluck, Neuhausen am Rheinfall, Switzerland

[73] Assignee: S I G Schweizerische Industrie-Gesellschaft, Neuhausen am Rheinfall, Switzerland

[22] Filed: Sept. 18, 1975

[21] Appl. No.: 614,594

[30] Foreign Application Priority Data

Sept. 18, 1974 Switzerland ............... 12664/74

[52] U.S. Cl. ............... 214/8.5 K; 214/8.5 SS; 221/251; 221/268
[51] Int. Cl.² ............................. B65G 59/06
[58] Field of Search ......... 214/8.5 SS, 8.5 K, 8.5 R; 221/251, 268

[56] References Cited

UNITED STATES PATENTS 1,330,639   2/1920   Leumann ............ 221/251 X
2,770,392  11/1956   Roberts ............... 221/251 X Primary Examiner—Robert J. Spar
Assistant Examiner—George F. Abraham
Attorney, Agent, or Firm—Spencer & Kaye

[57] ABSTRACT

In apparatus for forming a succession of cookies into groups as the cookies leave the vertical output portion of a supply shaft in which they are grouped, there being a clamping device movable between a position in which it holds the cookies in the shaft and a release position in which it permits the cookies to descend in the shaft, adjustment difficulties are reduced by the provision of a depository element which can move up and down, and a pusher which moves to deposit a group of cookies leaving the shaft onto the depository element when the latter is in its raised position and which moves to push such group away from the depository element when the latter is in its lowered position.

2 Claims, 2 Drawing Figures

APPARATUS FOR GROUPING COOKIES PRIOR TO PACKAGING

BACKGROUND OF THE INVENTION

The present invention relates to apparatus for forming cookies into groups during packaging.

Referring to Swiss Pat. No. 374,325 issued Dec. 31st, 1963, the same discloses an apparatus for grouping cookies in which the cookies are disposed in a supply shaft and are gripped in groups at the lower end of the shaft by a first pusher and pushed to a collection plate. The collection plate is lowered in stages until a sufficient number of small groups are combined thereon to form a large group which is then ejected by means of a second pusher.

One drawback of this apparatus is that each small group of cookies handled by the first pusher is being pressed upon by the overlying cookies in the shaft so that great friction is produced between the uppermost cookie of each group and the lowermost cookie which remains in the shaft, and this can cause damage, particularly to delicate cookies.

It has been proposed to eliminate this drawback by an apparatus for grouping flat objects, e.g. cookies, which are disposed one on top of the other in the lower vertical end of a supply shaft and which are periodically held there by a clamping device and then released to be moved in a group by a pusher which can be moved back and forth and up and down simultaneously. The group of cookies is first lowered to a depositor element disposed at a distance below the outlet opening of the shaft whereupon they are pushed away from the depository element while the clamping device is retracted. If in such a device the pushing away of a group of objects in fact occurs only when the objects are being held in the shaft by the clamping device the group is not subjected to stress and no damage of the objects need be feared.

It has been found, however, that known devices of this type are not satisfactory in practice because the proper setting of the clamping device is too difficult, particularly in the case of high-output machinery and when wide dimensional tolerances are encountered, or particularly if there is a change in the format of the objects.

SUMMARY OF THE INVENTION

It is an object of the present invention to eliminate the above-noted drawbacks and difficulties.

These and other object of the invention are achieved by apparatus which avoids such adjustment difficulties by including a depository element which can be moved up and down, and a pusher which deposits the group of flat objects released by the clamping device onto the depository surface of the depository element when the same is in the raised position and which pushes the group away from the depository surface when the latter is in the lowered position.

DESCRIPTION OF THE PREFERRED EMBODIMENTS

Figure 1:
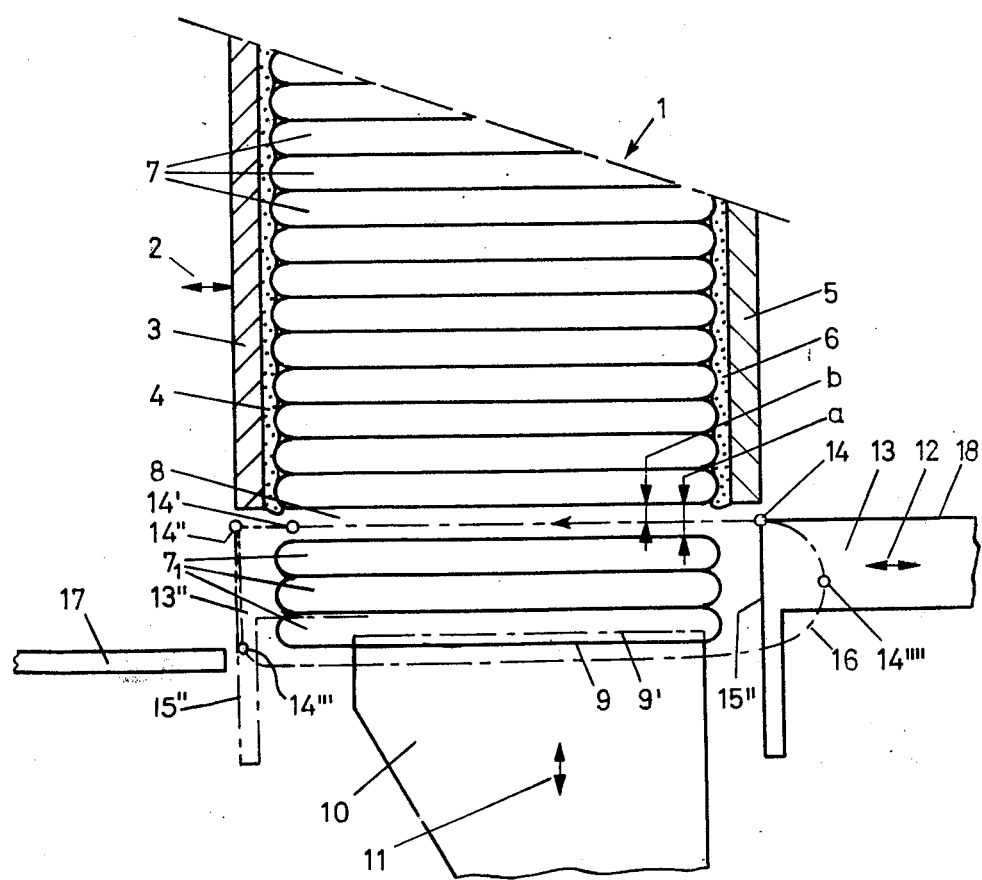
FIG. 1 of the drawing is a simplified elevational cross-sectional view of an embodiment of the present invention and FIG. 2 is a schematic view of the driving system.

FIG. 1 illustrates a grouping device which includes a supply shaft 1 having a square cross section, for example, of which only the lower end is shown. At this lower end, shaft 1 is provided with a wall 3 which can be moved in the direction of double arrow 2 and which will be referred to hereafter as the clamping wall.

If the supply shaft is broad or circular, clamping wall 3 is advantageously made of several parts with only the center part being movable. The clamping wall 3 is provided with a yieldable elastic coating 4 on its inside of, for example, foam rubber, some other foamed substance or a plurality of closely juxtaposed resilient nubs, ribs, or the like. A stationary wall 5 is disposed opposite clamping wall 3 and is also provided with a similar elastic coating 6 at its inside. The shaft 1 serves to supply round cookies 7, for example. In the illustrated clamping position of wall 3, the cookies 7 which are disposed at the bottom of shaft 1 are clamped in a gentle manner between the elastic coatings 4 and 6 of walls 3 and 5 in a manner which adapts to the tolerances of the cookie dimensions.

Below shaft 1 and at a distance from its outlet opening 8, there is provided a depository surface formed by the upper narrow sides 9 of a plurality of parallel, plate-shaped depository elements 10 which are permanently connected together at their lower ends (not shown) and which are movable up and down in the direction of the vertical double arrow 11 through a small distance which depends on the number of cookies per group and the thickness tolerances of the cookies which may be, for example, 2 to 3 mm.

A pusher which can be moved in the direction of the horizontal double arrow 12 and simultaneously in an up and down direction is formed by a plurality of parallel, plate-shaped pusher elements 13 which are located in the gaps between depository elements 10 to be displaceable with respect thereto. Pusher elements 13 are permanently connected together at their right-hand end, which is not shown in the drawing, and are coupled to a drive mechanism which imparts a periodic translatory movement to the pusher. The uppermost edge 14 of the pushing surface formed by the left-hand narrow sides 15 of the pusher elements 13 then describes the closed curve 16 which is shown in dashed lines.

Three cookies $7_1$ are shown to be resting on depository surface 9 of the depository element formed by elements 10. Between the uppermost cookie $7_1$ and the lowermost cookie 7 of the cookies which are clamped in shaft 1, there exists a small space $a$ which is present because the depository element 10 is in its lowermost position. Thus, when pusher 13 is moved toward the left, it can push the three cookies $7_1$ from the depository element 10 onto a table top 17 without the uppermost cookie $7_1$ rubbing against the lowermost cookie 7 in the shaft.

When edge 14 has reached approximately point 14' on curve 16, a drive mechanism (not shown) moves the clamping wall 3 toward the outside, i.e. toward the left in the Figure, so that the cookies 7 disposed in shaft 1 descend through a distance $b$, which is smaller than small space $a$, onto the back, or horizontal surface, 18 of pusher 13. The clamping device 3, 5 now initially remains open and pusher 13 moves into its left-hand end position 13'', shown in dot-dash lines, and moves then downwardly.

At the same time the depository element 10 is moved a little in the upward direction so that its depository surface 9 reaches point 9'. When pusher edge 14 reaches approximately point 14''' beyond the left-hand end position 14'', the group of cookies disposed on the back 18 of the pusher, which includes a group of three cookies $7_1$ in the present case, is deposited on depository surface 9 which is in the upper position 9' because pusher 13 then "disappears" into depository element 10 in that back 18 is below surface 9.

Now the clamping wall 3 is moved inwardly again so that the cookies 7 disposed in the lower part of shaft 1 are clamped in, whereupon the depository element 10 is lowered again and thus the distance $a$ between the stack of cookies $7_1$ and the lowermost cookie in the shaft is re-established. Edge 14 or the back 18 of the pusher, respectively, move upwardly only after they have left the region defined by the depository element 10 and return to their starting position after having passed a right-hand end position 4''', whereupon the process is repeated.

Table 17 and depository element 10 may be adjustable in height in order to be able to set the number of cookies per group, taking into consideration the thickness of the cookies.

The up and down movement of the depository element assures even with relatively wide tolerances for the cookie dimensions, that the stack will never be advanced under stress to the cookies 7 in the shaft 1 because the latter can never be clamped in too late during the operating cycle. On the other hand, clamping of the cookies 7 too early in the operating cycle, which would cause them to drop too far when the clamp is released, is prevented.

Table 17 may also serve as a collecting plate if required, i.e. may be lowered in stages in order to push a succession of small groups on top of one another and thus form a larger group of cookies, as in done in the apparatus disclosed in the above-mentioned Swiss Pat. No. 374,325.

Due to the up and down movement of the depository element 10, mutual adaptation of the movement of the clamped device 3, 5 and pusher 13 is substantially facilitated. It also provides sufficient time for a soft closing movement of the clamping device 3, 5 without damage to the cookies.

Figure 2:
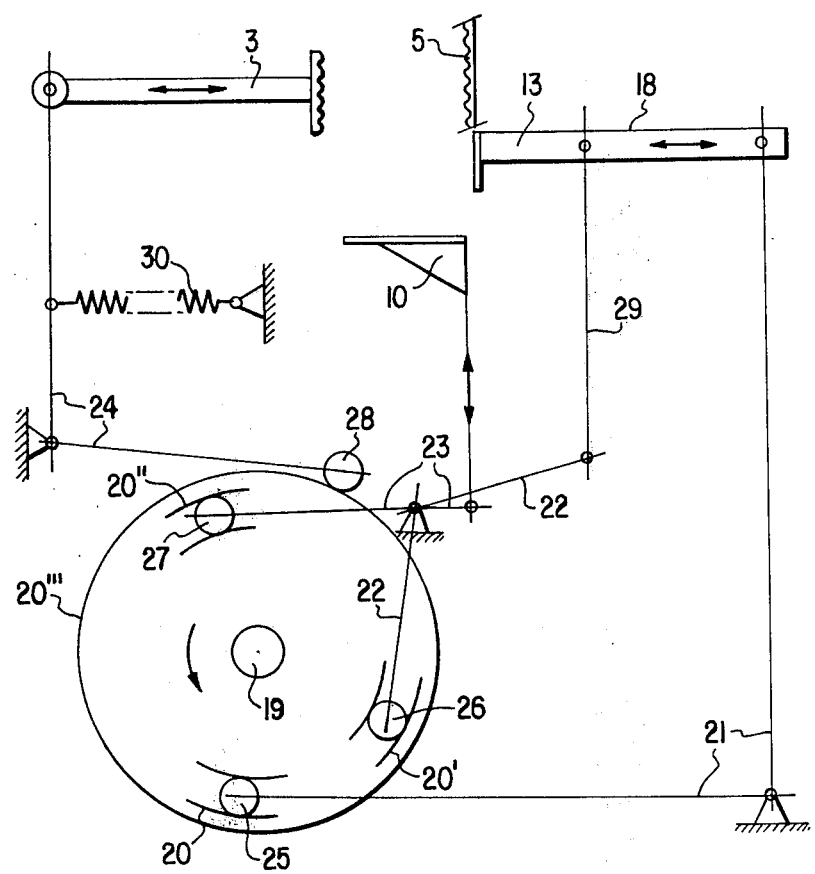

The drive shaft 19 of the device is provided with four cam discs 20 which are arranged one after another and which actuate the three adjustable elements 3, 10 and 13. These cam discs 20 are shown schematically in FIG. 2. Each of these discs 20 are engaged via rollers 25, 26, 27, 28 with respective two-armed levers 21, 22, 23, 24.

The movement of the plate shaped pusher element 13 along the closed curve 16 is generated under the action of the levers 21 and 22. The pusher element 13 is linkedly coupled to the upper end of the lever 21 and is linked to a rod 29 which itself is linked to the lever 22. By superimposing the swivel movements of the levers 21 and 22, the pusher element 13 is urged into a translatory movement. The swivel movement of the levers 21 and 22 is induced by the corresponding closed cam discs 20, 20' and the rollers 25 and 26.

A further closed cam disc 20'' imparts via the roller 27 a movement to the rod 23. This movement is further imposed on the depository element 10 in such a manner that the necessary adjustment (up and down motion) is urged upon the latter.

The last lever 24 carries the roller 28 and acts together with the curved disc 20'''. A spring 30 assures a permanent engagement between the lever 24 and the disc 20'''. The upper arm of the lever 24 is linkedly connected with the movable clamping device 3 so that a swivel movement imposed on the former will also be imparted on the latter.

It will be understood that the above description of the present invention is susceptible to various modifications, changes and adaptations, and the same are intended to be comprehended within the meaning and range of equivalents of the appended claims.

What is claimed is:
1. In apparatus for forming a succession of fragile flat objects into groups and including a supply shaft having a vertical outlet portion presenting an outlet end at its bottom, with a stack of such objects being disposed in the vertical outlet portion of the shaft, a clamping device associated with the shaft and movable between the clamping position in which it holds objects in the shaft and a release position in which it permits such objects to descend in the shaft, a depository member disposed below the outlet end of the shaft to receive objects leaving the outlet end, and a pusher member movable both transversely and parallel to the longitudinal direction of the vertical outlet portion of the shaft for bringing objects leaving the outlet end of the shaft when the clamping device is in its release position to the depository member and for then pushing such objects away from the depository member, the improvement wherein: said depository member is mounted for movement parallel to the longitudinal direction of said vertical outlet portion of said shaft, between a raised position and a lowered position; and said pusher member is mounted for movement in a manner to bring objects to said depository member when said depository member is in its raised position and to push such objects away from said depository member when said depository member is in its lowered position.

2. An arrangement as defined in claim 1 wherein said depository member comprises a plurality of flat, spaced-apart elements extending in planes parallel to the direction in which said pusher member pushes object away from said depository member, and said pusher member comprises a plurality of flat, spaced-apart elements disposed to move between said elements of said depository member.

* * * * *